United States Patent
Barouni Ebrahimi et al.

(10) Patent No.: US 10,831,900 B2
(45) Date of Patent: *Nov. 10, 2020

(54) SECURITY SCANNING OF APPLICATION PROGRAM INTERFACES THAT ARE AFFECTED BY CHANGES TO SOURCE CODE

(71) Applicant: International Business Machines Corporation, Armonk, NY (US)

(72) Inventors: Mohammadreza Barouni Ebrahimi, Ottawa (CA); Samaneh Bayat, Ottawa (CA); Obidul Islam, Kanata (CA); Vishwanath Ramaswamy, Carlsbad Springs (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/598,524

(22) Filed: Oct. 10, 2019

(65) Prior Publication Data

US 2020/0042718 A1    Feb. 6, 2020

Related U.S. Application Data

(63) Continuation of application No. 15/484,280, filed on Apr. 11, 2017, now Pat. No. 10,482,261.

(51) Int. Cl.
*G06F 21/57* (2013.01)
*G06F 11/36* (2006.01)
(Continued)

(52) U.S. Cl.
CPC .............. *G06F 21/577* (2013.01); *G06F 8/36* (2013.01); *G06F 8/70* (2013.01); *G06F 8/71* (2013.01);
(Continued)

(58) Field of Classification Search
CPC ...... G06F 21/577; G06F 8/70; G06F 11/3604; G06F 2221/033; G06F 8/36; G06F 8/71; H04L 67/02
See application file for complete search history.

(56) References Cited

U.S. PATENT DOCUMENTS 9,569,177 B2 *  2/2017  Kaulgud ................. G06F 8/30
9,898,393 B2 *  2/2018  Moorthi ............... G06F 11/368
(Continued)

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Mohammad A Siddiqi
(74) *Attorney, Agent, or Firm* — Law Office of Jim Boice (57) ABSTRACT

A method prevents source code from using an unsecure application program interface (API) due to a change to the source code. One or more processors and/or a user identify changes in source code. The processor(s) and/or user associate the changed code with affected APIs that are used by the changed code, and identify which commands are utilized by the changed code. The processor(s) and/or user determine that at least one command utilized by the changed code causes the source code to use an unsecure API. In response to determining that the at least one command utilized by the changed code causes the source code to use the unsecure API, the processor(s) and/or user modify the changed code to prevent the source code from using the unsecure API.

15 Claims, 6 Drawing Sheets

(51) Int. Cl.
*G06F 8/36* (2018.01)
*G06F 8/71* (2018.01)
*H04L 29/08* (2006.01)
*G06F 8/70* (2018.01)

(52) U.S. Cl.
CPC .......... *G06F 11/3604* (2013.01); *H04L 67/02* (2013.01); *G06F 2221/033* (2013.01)

(56) References Cited

U.S. PATENT DOCUMENTS

| | | | |
|---|---|---|---|
| 10,482,261 B2* | 11/2019 | Barouni Ebrahimi | .... G06F 8/71 |
| 2013/0247204 A1 | 9/2013 | Schrecker et al. | |
| 2013/0332444 A1 | 12/2013 | Kondratova et al. | |
| 2015/0040229 A1 | 2/2015 | Chan et al. | |
| 2015/0169392 A1 | 6/2015 | Mackay | |
| 2015/0371047 A1 | 12/2015 | Mendelev et al. | |
| 2016/0077901 A1 | 3/2016 | Roth | |
| 2016/0344777 A1 | 11/2016 | Fahlgren | |
| 2017/0228417 A1 | 8/2017 | Maccanti | |
| 2017/0250853 A1 | 8/2017 | Evans | |
| 2017/0364686 A1* | 12/2017 | Stafford | .................. G06F 8/315 |
| 2018/0260428 A1 | 9/2018 | Patel | |

OTHER PUBLICATIONS

Eric Minick, "Continuous Delivery Maturity Model". IBM Developerworks, Urban{Code}, Feb. 10, 2014. Web Oct. 27, 2016. <https://developer.ibm.com/urbancode/docs/continuous-delivery-maturity-model/>.

Thomas Stiehm, "Integrating Security Into Continuous Delivery". Linkedin Corporation, linkedin.com, Mar. 18, 2013, Web Oct. 27, 2016. <http://www.slideshare.net/TSTIEHM/INTEGRATING-SECURITY-INTO-CONTINUOUS-DELIVERY-V1.

U.S. Appl. No. 15/484,280—Non-Final Office Action dated Nov. 15, 2018.

List of IBM Patents or Patent Applications Treated as Related, Oct. 3, 2019, 2 pages.

* cited by examiner

SECURITY SCANNING OF APPLICATION PROGRAM INTERFACES THAT ARE AFFECTED BY CHANGES TO SOURCE CODE

BACKGROUND

The present invention relates to the field of computers, and particularly to computers that are capable of being tested for security exposures. Still more particularly, the present invention relates to security testing only application program interfaces that are affected by changes to source code that utilizes an asset supplied by those affected application program interfaces.

SUMMARY

In an embodiment of the present invention, a method selectively disables commands that are utilized by changed code. One or more processors and/or a user identify changes in a source code that result in changed code in the source code. The processor(s) and/or user associate the changed code with affected application program interfaces (APIs) that are used by the changed code. The processor(s) and/or user identify which commands are utilized by the changed code, and selectively disable the commands that are utilized by the changed code while leaving all other commands enabled in the affected APIs.

In an embodiment of the present invention, a method isolates a client computer from any resource provider that utilizes APIs that are affected by changed code. One or more processors and/or a user identify changes in a source code that result in changed code in the source code. The processor(s) and/or user associate the changed code with affected application program interfaces (APIs) that are used by the changed code. The processor(s) and/or user determine that the changed code affects unchanged code in the source code to create security vulnerabilities in the affected APIs, and isolate the client computer from any resource provider that utilizes the affected APIs.

In other embodiments of the present invention, the methods described herein are implemented as a computer program product and/or a computer system.

In an embodiment of the present invention, a computer system comprises: one or more processors; one or more computer readable memories, operably coupled to the one or more processors, wherein the one or more computer readable memories store program instructions for execution by at least one of the one or more processors, the stored program instructions comprising: program instructions to identify changes in a source code that result in changed code in the source code; program instructions to associate the changed code with affected application program interfaces (APIs) that are used by the changed code; program instructions to determine that the changed code affects unchanged code in the source code to create identified security vulnerabilities to affected APIs; and program instructions to isolate the client computer from any resource provider that utilizes the affected APIs.

DETAILED DESCRIPTION

Figure 1:
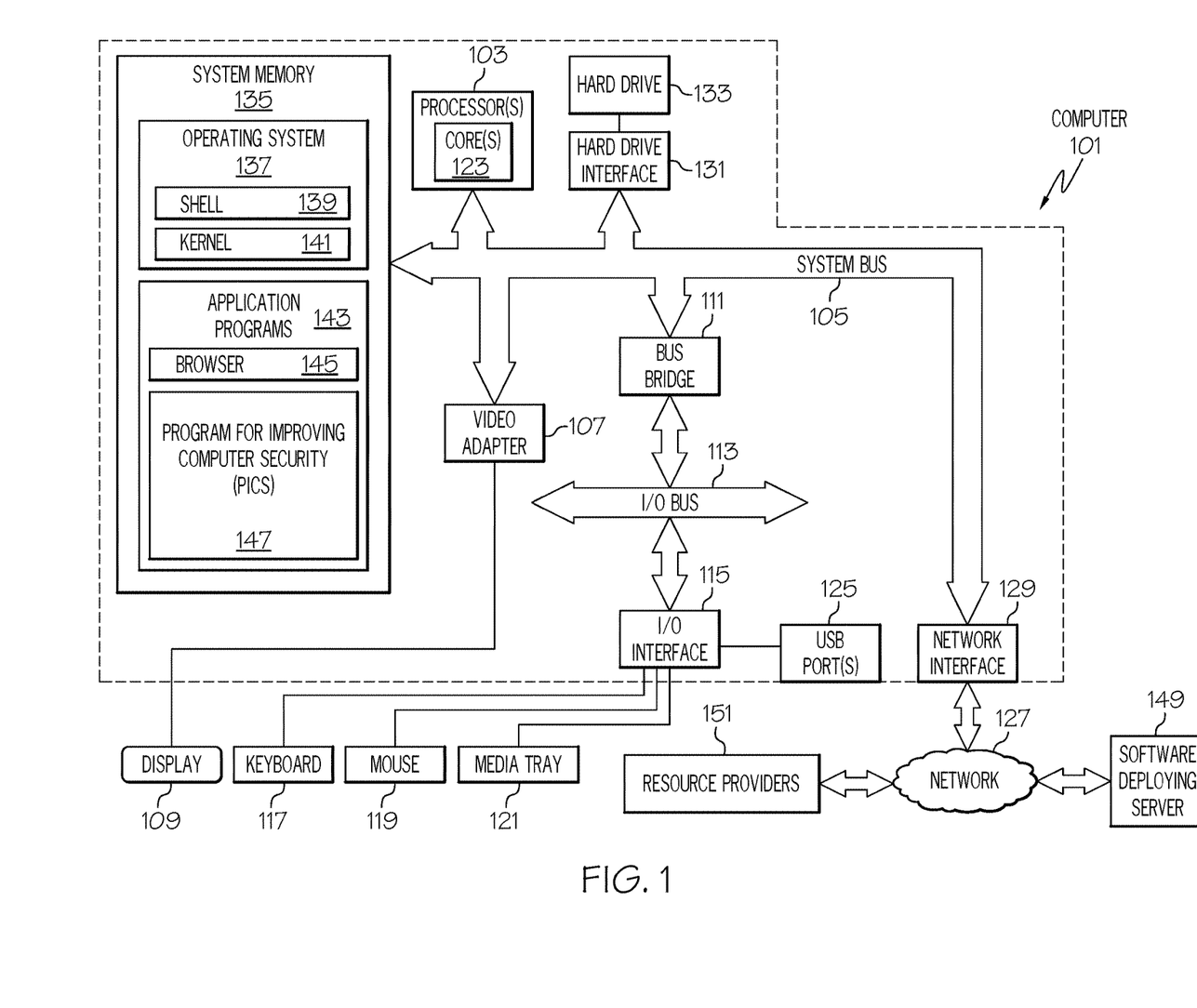
FIG. 1 depicts an exemplary system and network in accordance with one or more embodiments of the present invention.

With reference now to the figures, and in particular to FIG. 1, a block diagram of an exemplary system and network in accordance with one or more embodiments of the present invention is depicted. Some or all of the exemplary architecture, including both depicted hardware and software, shown for and within computer 101 can be utilized by: software deploying server 149 and/or resource providers 151 shown in FIG. 1.

With further reference to FIG. 1, exemplary computer 101 includes processor(s) 103, operably coupled to a system bus 105. Processor(s) 103 may embody or use one or more processor core(s) 123. A video adapter 107, which drives/supports a display 109, is also coupled to system bus 105.

System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), and external USB port(s) 125. While the format of the ports connected to I/O interface 115 may be any known to those skilled in the art of computer architecture, in one or more embodiments, some or all of these ports are universal serial bus (USB) ports.

As depicted, network interface 129 is also coupled to system bus 105. Network interface 129 can be a hardware network interface, such as a network interface card (NIC), etc. Computer 101 is able to communicate with a software deploying server 149 and/or remote video reviewing computers 151 via network interface 129 and network 127. Network 127 may include (without limitation) one or more external networks—such as a wide area network (WAN), and/or a network of networks such as the Internet—and/or one or more internal networks such as an Ethernet or a virtual private network (VPN). In one or more embodiments, network 127 includes a wireless network, such as a Wi-Fi network, and a cellular network. An example embodiment of the present invention utilizes a network "cloud" environment will be discussed with reference to FIGS. 5 and 6.

Referring again to FIG. 1, a hard drive interface 131 is also coupled to system bus 105. Hard drive interface 131 interfaces with a hard drive 133. In one embodiment, hard drive 133 is a non-volatile memory storing and populates a system memory 135 (e.g., random access memory (RAM)), which is also coupled to system bus 105. System memory may be considered a lowest level of volatile memory in computer 101. System memory 135 may include additional, higher levels of volatile memory (not shown), including, but not limited to, cache memory, registers and buffers. Data that populates system memory 135 includes computer 101's operating system (OS) 137 and application programs 143.

Operating system (OS) 137 includes a shell 139, for providing transparent user access to resources such as application programs 143. Generally, shell 139 is a program that provides an interpreter and an interface between the user and the OS. More specifically, shell 139 (sometimes referred to as a command processor) can execute commands entered into a command-line user interface or from a file. In other words, shell 139 can serve as a command interpreter. While shell 139 is a text-based, line-oriented user interface, the present invention will equally well support other user interface modes, such as graphical, voice, gestural, etc. As depicted, shell 139 can be considered the highest level of an OS software hierarchy. The shell can also provide a system prompt, interpret commands entered by keyboard, mouse, or other user input media, and send the interpreted command(s) to the appropriate (e.g., lower) levels of the operating system (e.g., a kernel 141) for processing.

As depicted, OS 137 also includes kernel 141, which includes (hierarchically) lower levels of functionality for OS 137. A few (non-limiting) examples of kernel functions include: providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions (not depicted) enabling a World Wide Web (WWW) client (i.e., computer 101) to send and receive network messages from network 127 (e.g., the Internet using hypertext transfer protocol (HTTP) messaging), thus enabling communication with software deploying server 149 and other systems.

In some embodiments, application programs 143 in computer 101's system memory include Program for Improving Computer Security (PICS) 147. In some embodiments, system memory 135 can be shared and/or application programs 143 distributed across one or more software deploying servers 149 or other systems. In the example depicted, PICS 147 includes program instructions (software) adapted for implementing processes and/or functions in accordance with the present invention, such as (without limitation) those described with reference to FIGS. 2-4. In some embodiments, PICS 147 is downloaded from software deploying server 149, (on-demand or "just-in-time") e.g., where the PICS 147 software is not downloaded until needed for execution. In some embodiments of the present invention, software deploying server 149 can perform all (or many) of the functions associated with the present invention (including execution of PICS 147), thus freeing computer 101 from having to use its internal computing resources.

The hardware elements depicted in computer 101 are not intended to be exhaustive, but rather are representative to highlight essential components required by the present invention. For instance, computer 101 may include alternate memory storage devices such as flash memory, magnetic cassettes, digital versatile disks (DVDs), Bernoulli cartridges, and the like. These and other variations are intended to be within the spirit and scope of the present invention.

As part of a software development cycle, a development team usually runs dynamic scanning tools on web based software products to find security vulnerabilities and fix them before releasing the product. The problem is that dynamic scanning is a time consuming process as it needs to crawl numerous pages of the product to discover the security vulnerabilities of the software product. That is, such approaches crawl voluminous lines of the product code itself in an effort to identify security vulnerabilities, particularly those that are caused by changes to the product code itself.

As such, the present invention does not look for security vulnerabilities in the source code itself, but rather in the application program interfaces (API) that the source code utilizes. That is, in a development operation process, as developers change the source code, the modified APIs can be distinguished from the source code and security scans can be configured to test only those APIs. This approach significantly reduces the execution time of the dynamic security scan.

Thus, as developers change the source code, the system delivers the source code (including the changed portions of the source code) to a version control tool. Based on the history of the source code, the modified methods and classes can be identified. A developer tool can then be used to find the call hierarchy to connect those methods to the corresponding APIs that are recognized by a source code analysis tool. Parameters of the affected APIs are then manipulated, and requests to the affected APIs are then run in order to find potential security vulnerabilities.

As mentioned above, security testing of source code is a time-consuming operation that highly affects the duration of continuous delivery cycles. An existing approach to handle this problem is to run parallel tests. However, the problem with this approach is that it runs all the tests without considering which areas are affected.

Dynamic analysis tests require a running web application to receive test traffic, so splitting a huge test configuration into parallel pieces is burdened by configuring one or more servers that can handle the incoming requests. Successful invasive tests can affect server availability, which in turn affects other parallel tests, which leads to requiring repetition of the whole test suite in order to reach the end of test configuration.

Thus, the present invention provides a novel and improved process for testing the impact of changes to the source code by 1) identifying which APIs are affected by the changed source code, and 2) testing only the identified affected APIS that are affected by latest changes to the code. This approach significantly reduces the amount/length of the security tests to be done for each code delivery without reducing the coverage, which enables the tests to be run more frequently, on single or fewer servers. As a result it reduces the feedback time to the developer, which means faster identification and resolution for security problems, which integrates well into continuous delivery model. Thus, dynamic security testing is no longer a burden for continuous delivery; rather it becomes part of it.

For example, consider the following scenario.

In one embodiment of the present invention, assume that a particular project source code utilizes hundreds of resources, which are accessed by APIs such as REpresentational State Transfer (REST) APIs, which use HyperText Transfer Protocol (HTTP) protocols. As such, a REST API provides an interface between a webpage and content that will populate the webpage. Such content may be snippets, portlets, text documents, photo images, videos, etc.

The present invention identifies only the related APIs/REST APIs that are directly impacted due to the source code change. The improvement over the prior art reduces the execution time of dynamic security testing by not only testing APIs instead of the source code itself, but also limiting the dynamic security testing to only those API's that are affected by the source code change.

When the source code changes, two possible results may occur.

One result is that the change to the source code may alter the API it was previously using. For example, assume that a snippet of source code passes a new parameter to the API that it was previously using, such as the user's password, token, etc. As such, the API is now also altered, making the source code vulnerable to attack (since the API has the security secrets used by the source code).

Another result of a change to the source code is that a particular snippet may start using a different API than used previously. For example, the source code may have originally called an API that is protected by a security system, such that the source code is safe to exchange private information with that API. However, if a change to the source code now has it calling an unsecure API, then the security information previously being exposed by the source code is now available to the public without protection.

As described herein, then the present invention is not about measuring coverage of a full dynamic scan. Rather, the system configures a very small scan (just a subset) of only affected APIs for every change that is identified in the source code, without attempting to cover all entry points to the source code (via the APIs).

Figure 2:
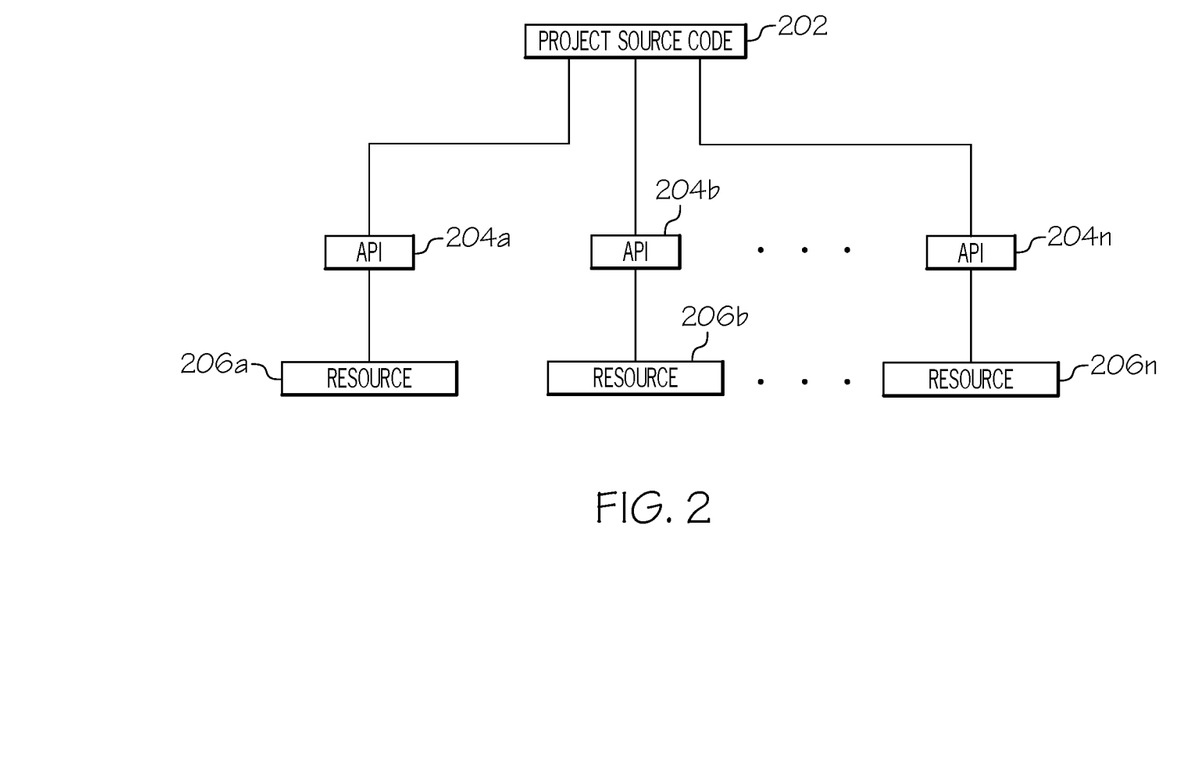
FIG. 2 illustrates an exemplary relationship between source code that is being developed, resources used by the source code, and application program interfaces (APIs) that allow the source code and the resources to interact.

With reference now to FIG. 2, assume that an exemplary project source code 202 is being developed (e.g., within a client computer such as computer 101 shown in FIG. 1). That is, assume that a developer is using an Integrated Development Environment (IDE) to modify the project source code 202. As shown in FIG. 2, various sections of the project source code 202 are written to call on one or more of APIs 204a-204n (where "n" is an integer) in order to access one or more of the resource 206a-206n. While each of the APIs 204a-204n is depicted as providing access to only one of the resources 206a-206n, in an embodiment of the present invention a single API may provide access to multiple resources and a single resource may be accessed by multiple APIs.

In an embodiment of the present invention, the project source code 202 is a HyperText Markup Language (HTML) document that is used to produce a webpage. As such, project source code 202 may use HTTP commands (e.g., GET, POST, PUT, DELETE, etc.) to get, submit, update, delete, etc. data in resources 206a-206n. However, such commands do not go directly from the project source code 202 to the resources 206a-206n. Rather, they are sent to APIs 204a-204n, which are REST APIs that are able to process HTTP commands in a stateless manner.

Figure 3:
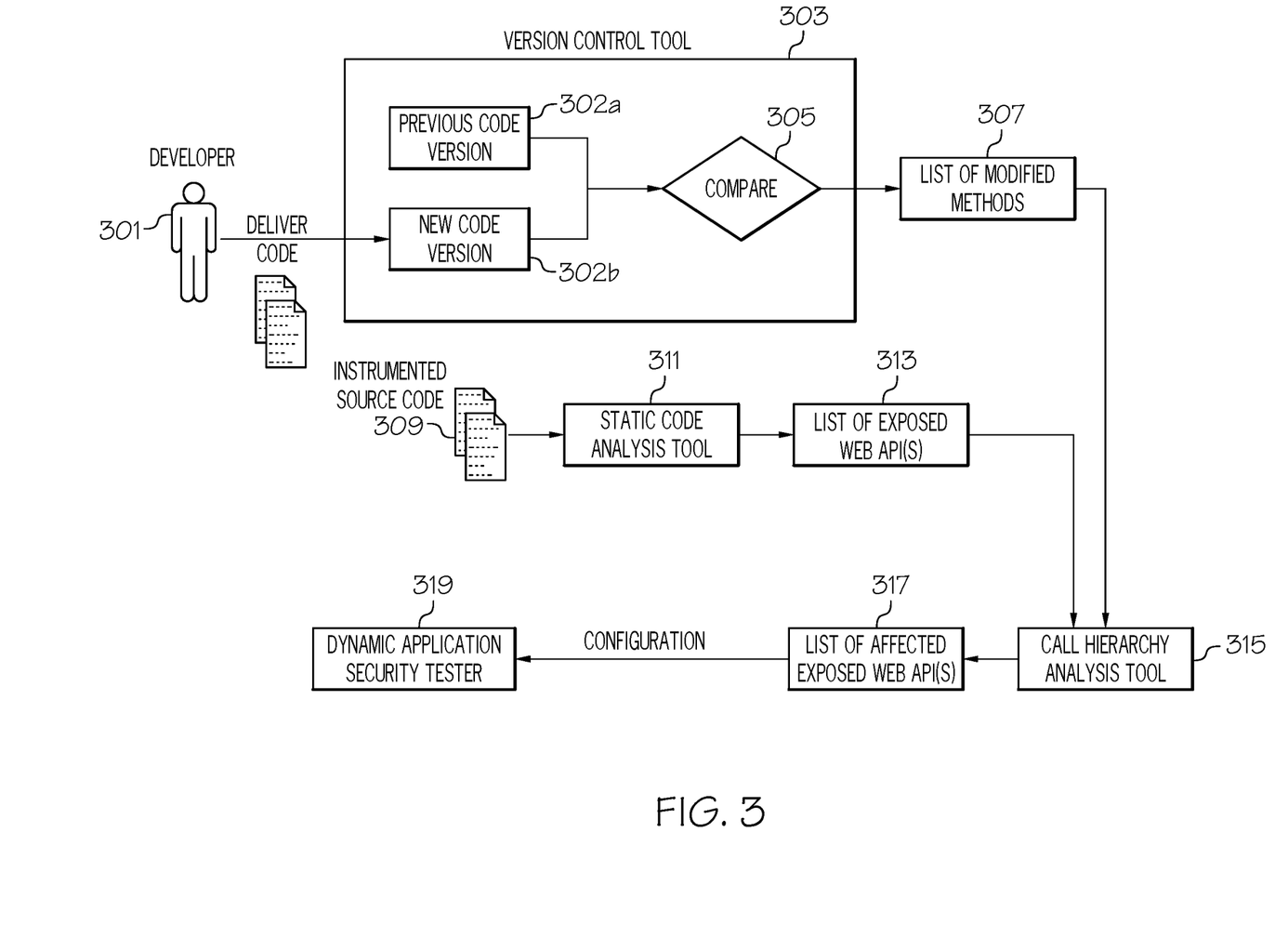
FIG. 3 depicts an exemplary overview of one or more embodiments of the present invention.

With reference now to FIG. 3, assume that developer 301 has delivered a new code version 302b of the previous code version 302a of a project source code. A version control tool 303 (i.e., a system that compares (block 305) the new code version 302b to the previous code version 302a for any changes found in the new code version 302b) generates a list of modified methods 307 (i.e., changed source code), and sends this list of modified methods 307 to a call hierarchy analysis tool 315 (discussed further below).

Instrumented source code 309 (i.e., the project source code) is also sent to a static code analysis tool 311, which creates a list of exposed web APIs 313. That is, the static code analysis tool 311 examines the instrumented source code 309 in order to determine which APIs (including but not limited to REST APIs discussed above) are called by the instrumented source code 309.

The call hierarchy analysis tool 315 then compares which APIs from the list of exposed web APIs 313 are affected by the modified source code found in the list of modified methods 307. That is, any modified method in the source code that utilizes one or more of the APIs found in the list of exposed web APIs 313 is used to generate a new list or update an existing list of affected exposed web APIs 317 by the call hierarchy analysis tool 315. The APIs found in the list of affected exposed web APIs 317 is configured by manipulating parameters within the affected APIs based on the changes in the source code. That is, an affected API is configured to reflect the changes required of the changed method.

For example, assume that the modified method no longer sends an HTTP GET command to an API (as performed in the previous code version 302a), but rather sends an HTTP DELETE command to that API. As such, that API is modified to reflect that it is now designed to DELETE a resource (e.g., one of the resources 206a-206n shown in FIG. 2) rather than retrieve (GET) data from a resource. Thus, the change to the source code causes a change to the API that it uses.

As shown in FIG. 3, these modified/reconfigured APIs are sent to a dynamic application security tester 319, which sends test code/data to the modified/reconfigured APIs, in order to determine whether or not they now present a security risk to the project source code, the computer on which the project source code is running, the resources called by the modified/reconfigured APIs, and/or the computer systems that serve these resources.

Figure 4:
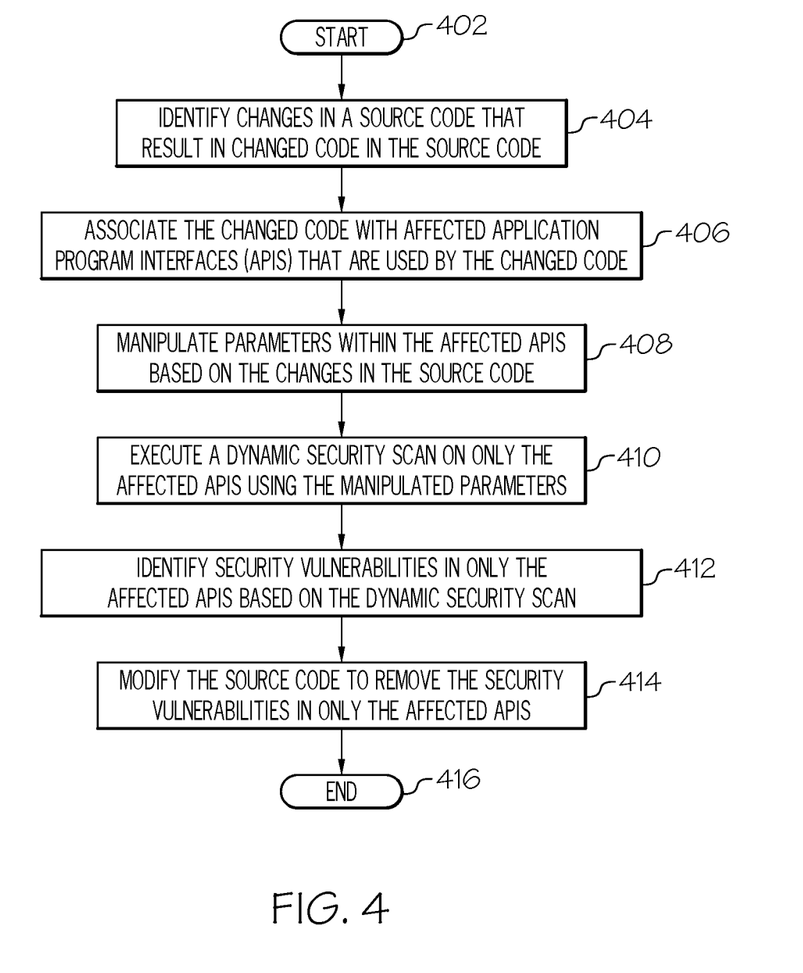
FIG. 4 depicts an exemplary method in accordance with one or more embodiments of the present invention.

With reference now to FIG. 4, an exemplary method performed by one or more processors in accordance with one or more embodiments of the present invention is presented.

After initiator block 402, one or more processors (e.g., processors 103 shown in FIG. 1) identify changes in a source code (e.g., previous code version 302a shown in FIG. 3) that result in changed code (e.g., new code version 302b) in the source code, as described in block 404.

As described in block 406, one or more processors associate the changed code with affected application program interfaces (APIs) (e.g., one or more of the APIs 204a-204n shown in FIG. 2) that are used by the changed code.

As described in block 408, one or more processors manipulate parameters within the affected APIs based on the changes in the source code (as described in FIG. 3).

As described in block 410, one or more processors then execute a dynamic security scan (e.g., using the dynamic application security tester 319 shown in FIG. 3) on only the affected APIs using the manipulated parameters. That is, the dynamic security scan tests the affected APIs by exploiting the changes made to the APIs by the manipulated parameters (e.g., new commands in the affected APIs, new exposures to other APIs and/or other resources for the affected APIs, changed security requirements in the affected APIs, etc.).

As described in block 412, one or more processors identify (e.g., by the dynamic application security tester 319 shown in FIG. 3) any security vulnerabilities in only the affected APIs (based on the dynamic security scan).

As described in block 414, the source code is then modified (e.g., automatically by the system or alternatively by a coder) in order to remove the security vulnerabilities in only the affected APIs. That is, the affected/vulnerable APIs are modified in order to remove the security problem.

In an embodiment of the present invention, modification to the source code only affects (modifies) the changed code, while in another embodiment modifying the source code modifies source code other than the changed code (i.e., unchanged source code found in the original version). That is, the examination of the changed source code may determine that the security exposure is caused directly by the code that has been changed in the project source code. As such, only the change code is modified (e.g., restored back to its original version or else recoded). Alternatively, the changed code may impact another part of the source code that is unchanged. However, the changed code now exposes the other part of the source code to a security exposure. As such, the changed code may remain changed, but the other part of the source code is changed in order to remove the security exposure presented by that other part of the source code.

The flow chart in FIG. 4 ends at terminator block 416.

In an embodiment of the present invention, the APIs are REpresentational State Transfer (REST) APIs that respond to HyperText Transfer Protocol (HTTP) commands from a client computer on which the source code is being modified (as described above). In one embodiment of the present invention in this scenario (where REST APIs are used), one or more processors will identify which HTTP commands are utilized by the changed code, and will then selectively disable the HTTP commands that are utilized by the changed code while leaving all other HTTP commands enabled in the REST API. For example, assume that a change to the source code changed an HTTP command from GET to DELETE. If the system determined that this presented a security exposure to the source code, then the HTTP command DELETE is disabled such that the attending API will not be able to process it. That is, the system will place the HTTP command DELETE on a "do not execute" list in the API, such that the command will not be executed, thus exposing the source code and its host system to a security problem.

In an embodiment of the present invention, one or more processors detect a change to the affected APIs that is caused by the changed code in the source code. For example, a change in the source code may alter the API itself. For example, the change to the source code may be "Change any instruction in the API from GET to DELETE". If this change to the API exposes the source code to a security exposure (e.g., if the resource that is supported by the API is an encryption program that, if deleted, removes any encryption protection from the project source code), then one or more processors will reverse the change to the affected APIs in order to restore the affected APIs to their original version (e.g., change DELETE in the API back to GET).

In an embodiment of the present invention, in response to identifying the security vulnerabilities, one or more processors isolate the client computer (on which the project source code is running) from any resource provider that utilizes the affected APIs. That is, if the change to the source code affects an API in a manner that exposes the source code to a new (or altered) resource that will harm the project source code (or the client system on which it is running), then a connection is broken (e.g., by disabling a port, block transmission, etc.) between the project source code (and/or its host computer) and the resource (and/or the server that provides the resource) such that the project source code can no longer call the resource up.

One or more embodiments of the present invention may be implemented in a cloud computing environment. Nonetheless, it is to be understood that although this disclosure includes a detailed description of cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
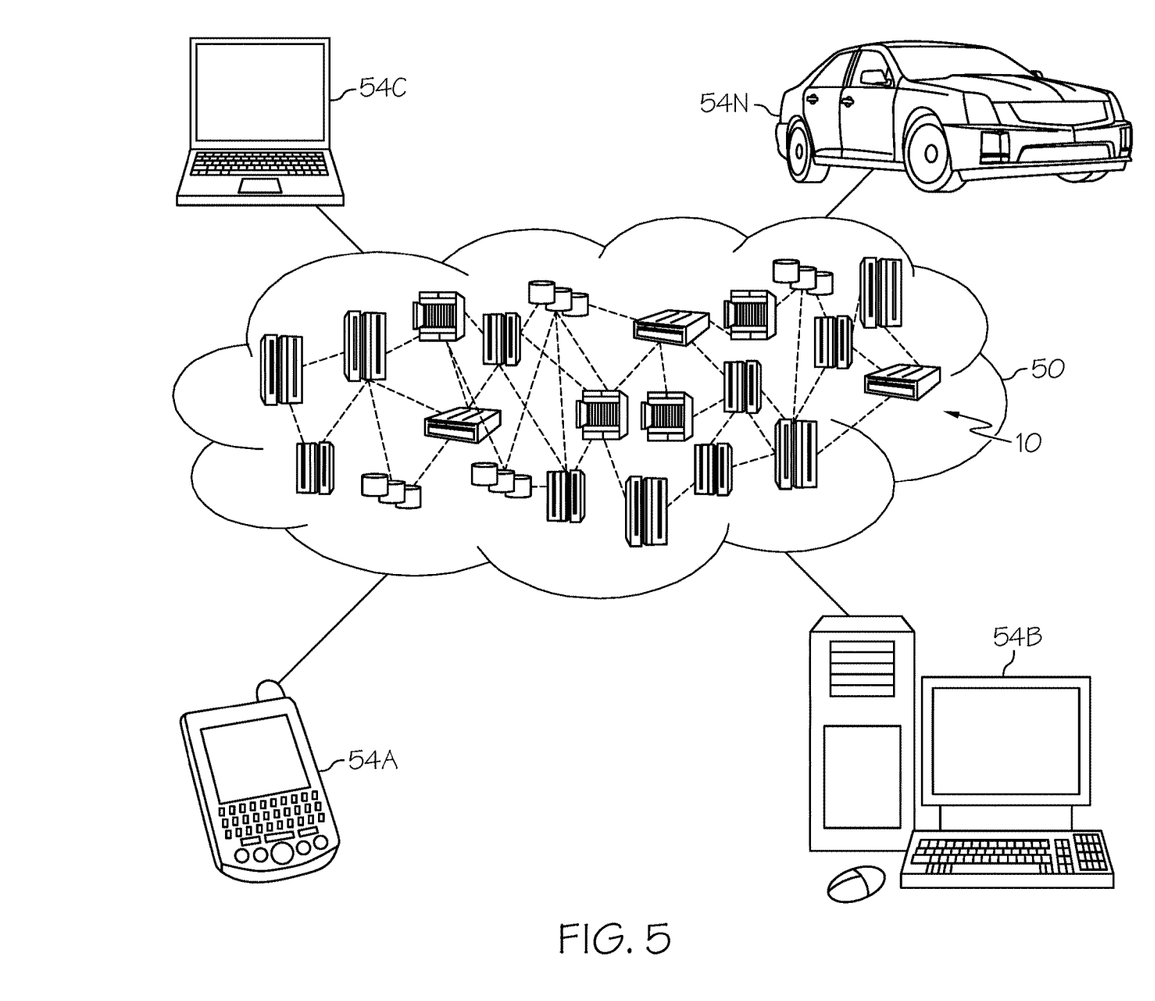
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 5 are intended to be illustrative only and that computing nodes 10 and cloud computing environment 50 can communicate with any type of computerized device over any type of network and/or network addressable connection (e.g., using a web browser).

Figure 6:
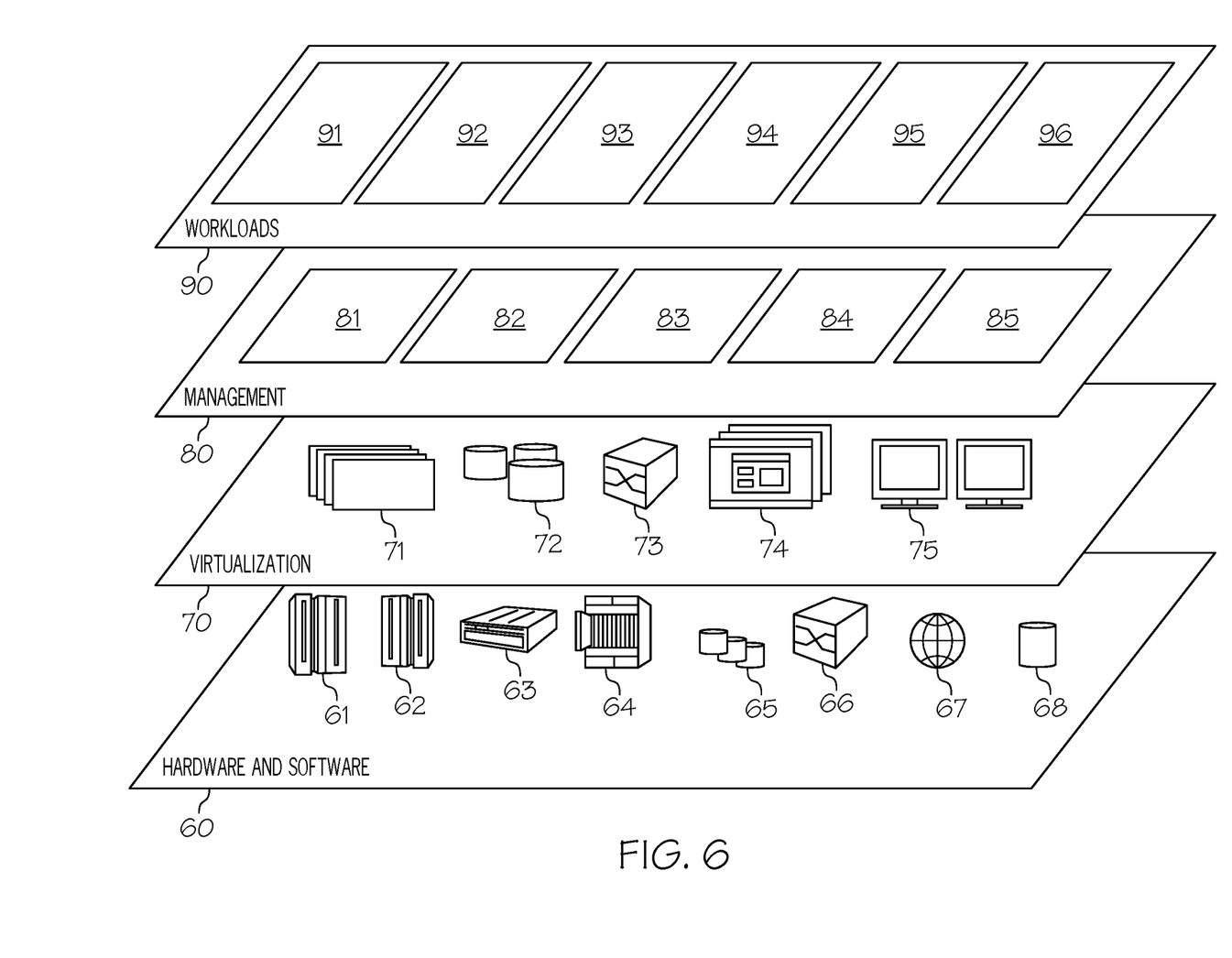
FIG. 6 depicts abstraction model layers of a cloud computing environment according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and API security test processing 96, which can perform one or more features of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Methods described in the present invention may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. By way of further example (only), one or more computer-implemented (e.g., in software) methods described herein may be emulated by a hardware-based VHDL program, which can then be applied to a VHDL chip, such as a FPGA.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   identifying changes in a source code that result in changed code in the source code;
   associating the changed code with affected application program interfaces (APIs) that are used by the changed code;
   identifying which commands are utilized by the changed code;
   determining that at least one command utilized by the changed code causes the source code to use an unsecure application program interface (API); and
   in response to determining that the at least one command utilized by the changed code causes the source code to use the unsecure API, modifying the changed code to prevent the source code from using the unsecure API.

2. The method of claim 1, further comprising:
   retaining the changes in the changed code in the source code while modifying unchanged code in the source code, wherein modifying the unchanged code in the source code removes security vulnerabilities in the affected APIs.

3. The method of claim 1, further comprising:
   determining that the changed code in the source code passes a user's password to at least one of the affected APIs; and
   in response to determining that the changed code in the source code passes the user's password to the API, modifying the changed code to prevent the source code from passing the user's password to the at least one of the affected APIs.

4. The method of claim 1, wherein the affected APIs are REpresentational State Transfer (REST) APIs that respond to HyperText Transfer Protocol (HTTP) commands from a client computer on which the source code is being modified.

5. The method of claim 4, further comprising:
   identifying which HTTP commands are utilized by the changed code; and
   selectively disabling, by one or more processors, the HTTP commands that are utilized by the changed code while leaving all other HTTP commands enabled in the REST API.

6. A method comprising:
   identifying changes in a source code that result in changed code in the source code;
   associating the changed code with affected application program interfaces (APIs) that are used by the changed code;
   determining that the changed code affects unchanged code in the source code to create security vulnerabilities in the affected APIs;
   determining that the changed code in the source code causes the source code to use an unsecure application program interface (API); and
   in response to determining that the changed code in the source code causes the source code to use the unsecure API, modifying the changed code to prevent the source code from using the unsecure API.

7. The method of claim 6, further comprising:
   retaining the changes in the changed code in the source code while modifying unchanged code in the source code, wherein modifying the unchanged code in the source code removes security vulnerabilities in the affected APIs.

8. The method of claim 6, further comprising:
   determining that the changed code in the source code passes a user's password to the affected APIs; and
   in response to determining that the changed code in the source code passes the user's password to the affected APIs, modifying the changed code to prevent the source code from passing the user's password to the affected APIs.

9. The method of claim 6, wherein the affected APIs are REpresentational State Transfer (REST) APIs that respond to HyperText Transfer Protocol (HTTP) commands from a client computer on which the source code is being modified.

10. The method of claim 9, further comprising:
    identifying which HTTP commands are utilized by the changed code; and
    selectively disabling the HTTP commands that are utilized by the changed code while leaving all other HTTP commands enabled in the REST APIs.

11. A computer system comprising:
    one or more processors;
    one or more non-transitory computer readable memories, operably coupled to the one or more processors, wherein the one or more non-transitory computer readable memories store program instructions for execution by at least one of the one or more processors, the stored program instructions comprising:
    program instructions to identify changes in a source code that result in changed code in the source code;
    program instructions to associate the changed code with affected application program interfaces (APIs) that are used by the changed code;
    program instructions to determine that the changed code affects unchanged code in the source code to create identified security vulnerabilities to affected APIs;
    program instructions to determine that the changed code in the source code causes the source code to use an unsecure application program interface (API); and
    program instructions to, in response to determining that the changed code in the source code causes the source code to use the unsecure API, modify the changed code to prevent the source code from using the unsecure API.

12. The computer system of claim 11, further comprising:
    program instructions to retain the changes in the changed code in the source code while modifying unchanged code in the source code, wherein modifying the unchanged code in the source code removes security vulnerabilities in the affected APIs.

13. The computer system of claim 11, further comprising:
    program instructions to determine that the changed code in the source code passes a user's password to the affected APIs; and
    program instructions to, in response to determining that the changed code in the source code passes the user's password to the affected APIs, modify the changed code to prevent the source code from passing the user's password to the affected APIs.

14. The computer system of claim 11, wherein the affected APIs are REpresentational State Transfer (REST) APIs that respond to HyperText Transfer Protocol (HTTP) commands from a client computer on which the source code is being modified.

15. The computer system of claim 11, wherein the stored program instructions are provided as a service in a cloud environment.

* * * * *